(12) United States Patent
Kiernicki et al.

(10) Patent No.: US 6,173,099 B1
(45) Date of Patent: Jan. 9, 2001

(54) SNAP-IN COUPLING

(75) Inventors: Leopold Kiernicki, Niles; Philip W. Schofield, Oak Park, both of IL (US)

(73) Assignee: Stratos Lightwave, Inc., Chicago, IL (US)

( * ) Notice: Under 35 U.S.C. 154(b), the term of this patent shall be extended for 0 days.

(21) Appl. No.: 09/092,759

(22) Filed: Jun. 5, 1998

(51) Int. Cl.[7] .................................................. G02B 6/38
(52) U.S. Cl. ................................ 385/78; 385/55; 385/72
(58) Field of Search ................................. 385/53–60, 63, 385/71, 72, 77, 78; 174/282, 278, 293, 295

(56) References Cited

U.S. PATENT DOCUMENTS

| | | | | |
|---|---|---|---|---|
| 4,798,441 | * | 1/1989 | Clark .................................... | 350/96.2 |
| 5,076,656 | * | 12/1991 | Briggs et al. ........................... | 385/60 |
| 5,121,455 | * | 6/1992 | Palecek ................................. | 385/69 |
| 5,142,597 | * | 8/1992 | Mulholland et al. ................... | 385/56 |
| 5,317,663 | * | 5/1994 | Beard et al. ........................... | 385/70 |
| 5,486,124 | * | 1/1996 | Wandler ................................ | 439/843 |
| 5,506,922 | * | 4/1996 | Grois et al. ........................... | 385/75 |
| 5,542,015 | * | 7/1996 | Hultermans ........................... | 385/60 |
| 5,621,836 | * | 4/1997 | Schofield .............................. | 385/80 |
| 5,937,121 | * | 8/1999 | Ott et al. .............................. | 385/59 |

* cited by examiner

Primary Examiner—Hemang Sanghavi
(74) Attorney, Agent, or Firm—Karl D. Kovach; David L. Newman

(57) ABSTRACT

A coupling is provided having a one-piece body, with a first segment having a first chamber for receiving an optical connector and ferrule, a second segment having a second chamber for receiving an alignment sleeve that retains and interconnects the ferrules, a third segment substantially similar to the first segment and having a third chamber for receiving a second optical connector and ferrule, wherein said first, second and third chambers are aligned longitudinally across the one-piece body, and a resilient arm extends from the one-piece body to allow the coupling of the invention to be received by a coupling aperture.

28 Claims, 4 Drawing Sheets

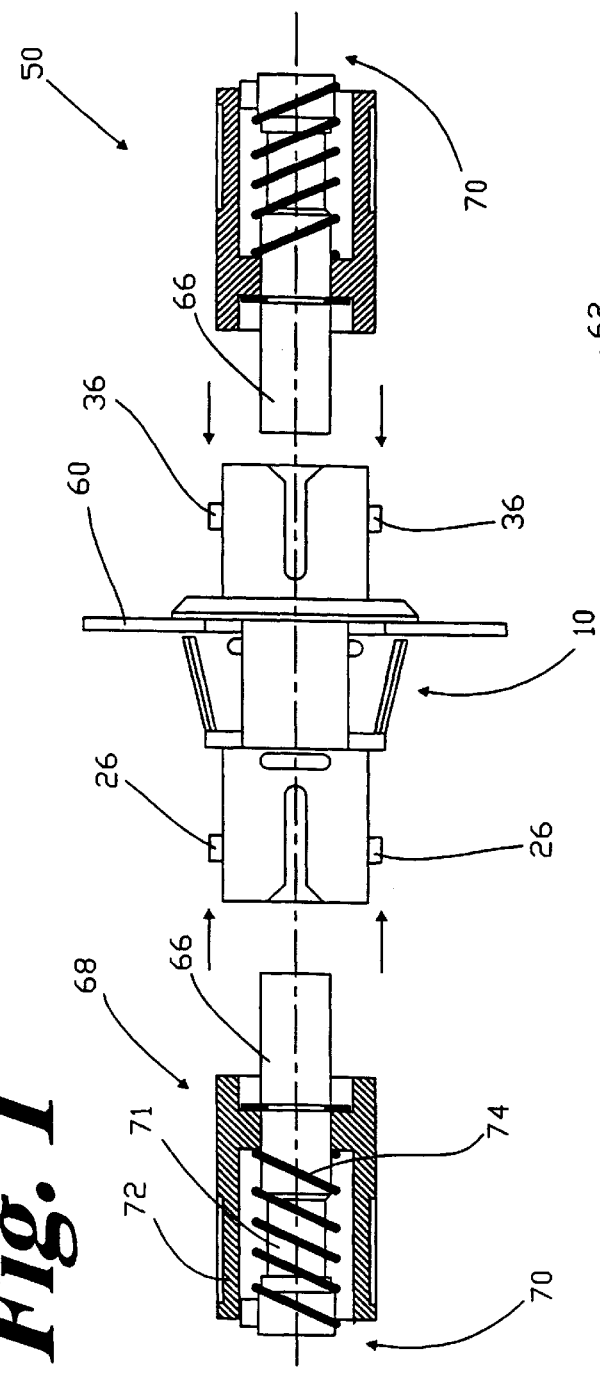
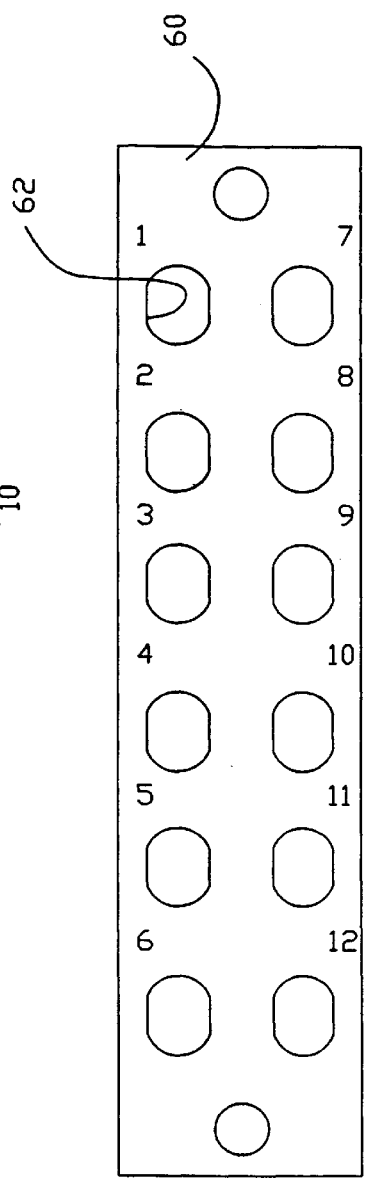

SNAP-IN COUPLING

BACKGROUND OF THE INVENTION

1. Field of the Invention

This invention pertains to the art of interconnecting fiber optical ferrules. More specifically, this invention pertains to couplings that interface and interconnect fiber optical ferrules.

2. Discussion of the Background

The diverse growth of technology incorporating fiber optical communications has expanded the employment of fiber optical cables and transmission lines. In accordance with the expanded use of fiber optical technology, it is now established art to terminate fiber optical lines with ferrules containing one or more optical fibers. In turn, fiber optical lines may interconnect to one another by optically aligning opposing ferrules. However, ferrules require frequent maintenance, including polishing and cleaning, as the ferrule's ability to transmit data may be significantly hampered by slight imperfections that affect the optical fiber contained therein. In addition, fiber optical transmission lines must increasingly be interchangeably connected and disconnected to selectively interface computers and/or communication devices that utilize fiber optic technology.

The increased use of fiber optical technology in the described manner has necessitated the need for better management and organization of optical cables. To this end, the known art employs connector panels that retain couplings for releasably interfacing and optically interconnecting ferrules. Such connector panels may typically be found in connector cabinets that provide coverage and maintenance access to the fiber optical interconnections. In more complex systems, the connector cabinets may be housed within a telecommunication center that organizes multiple connector cabinets and related items.

This invention addresses several shortcomings that hinder efficient interconnectivity of fiber optical ferrules, as well as the organization and management of optical cables across connector panels. In particular, the known art provides couplings that secure to the connector panel through a washer and nut assembly. However, telecommunication centers now typically employ numerous fiber optical cables that interchangeably connect and disengage with one another. As such, connector panels must provide a greater number of coupling apertures for providing the couplings that interconnect the optical fibers.

In this context, the known art limits the proximity of the coupling apertures along the connector panels because the washer and nut assemblies are relatively spacious and require additional area on the connector panel. As a result, connector panels that interconnect 12, 18 or more fiber optical connectors require substantial panel length and area, which in turn affect the overall size of the connector cabinet.

Still another problem associated with the prior art is that the cost of manufacturing is increased by the use of multiple components and metallic parts. Known couplings utilize metallic housings and threaded components for engaging connector panels and optical ferrules. Such components require precision dye cast molding and expensive materials. Most importantly, the congested and confined environment of connector panels impedes the assembling of prior art coupling to connector panels.

With these limitations in mind it is an object of this invention to provide a coupling for interconnecting fiber optical connectors, where the coupling may be retained in a coupling aperture without the need for washers and nuts.

It is still another object of this invention to provide a coupling that allows for coupling apertures to more compactly allocate along a connector panel.

Still another object of this invention is to provide a coupling that has a one-piece body, preferably molded from plastic.

And still another object of this invention is to provide a coupling that easily attaches to and releases from a connector panel, preferably by snapping into and out of the connector panel.

SUMMARY OF THE INVENTION

In a basic embodiment, the snap-in coupling of this invention comprises a one-piece body adapted to be frictionally received by a coupling aperture on a connector panel or similar device. The one-piece body has a first and second opening that axially oppose one another, where the first and second opening are each adapted to receive a straight-tipped optical connector or ferrule. The first and second openings define a continuous chamber that extends therebetween. The embodiment further includes a first resilient arm that extends outward from the one-piece body, such that the one-piece body may be received by the coupling aperture when the resilient arm is biased inward. The coupling aperture may also include a radial extension from the one-piece body that limits axial movement when the coupling engages the coupling aperture. A portion of the chamber may also be adapted to receive an alignment sleeve for aligning a pair of opposing ferrules.

In another embodiment of the invention, a one-piece body is adapted to engage a coupling aperture of a connector panel or similar device. The one-piece body includes a first segment having a first chamber extending longitudinally therein from a first opening, wherein the first chamber is adapted to receive through the first opening an optical connector or ferrule. The one-piece body also includes a second segment that adjoins the first segment and has a second chamber extending longitudinally therein in alignment with the first chamber. The one-piece body also includes a third segment that is substantially identical to the first segment. The third segment has a third chamber extending longitudinally therein towards a second opening and in alignment with the first and second chamber. The third chamber is also adapted to receive through the second opening an optical connector or ferrule, wherein the second opening longitudinally opposes the first opening across the one-piece body. The one-piece body also includes a resilient arm that angularly extends outward from the one-piece body. The resilient arm may be biased towards the one-piece body to allow the coupling to be received and engaged by the coupling aperture. In this embodiment, the second chamber is also adapted to receive an alignment sleeve to optically interconnect opposing ferrules inserted therein from the first and second chamber.

Still further, the snap-in coupling of the invention may comprise a one-piece molded plastic body that is adapted to engage the aforementioned coupling aperture. The one-piece body has a first cylindrical segment that defines a first chamber extending longitudinally from a first opening. The first chamber is preferably adapted to retain a straight-tipped optical connector through the first opening. A second segment merges with the first cylindrical segment and defines a second chamber aligned with the first chamber. The one-piece body also includes a third cylindrical segment that is substantially identical to the first cylindrical segment, and includes a third chamber that extends longitudinally towards a second opening and aligns with the first and second chamber. As with the first chamber, the third chamber is preferably adapted to retain a straight-tipped style optical connector through the second opening, which longitudinally opposes the first opening across the one-piece body. A pair of resilient arms extend angularly outward from the second segment and diametrically oppose one another around the periphery of the one-piece body. The second segment is adapted to be frictionally received by a coupling aperture when the resilient arms are biased towards the one-piece body. The second chamber may also be adapted to receive an alignment sleeve that retains and interconnects ST style optical ferrules on opposing ends.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a top view of the snap-in plug of this invention engaged with opposing optical cables and ferrules and a connector panel;

FIG. 2 is a leftward view of the front face of the connector panel employed with this invention;

DETAILED DESCRIPTION OF THE PRESENTLY PREFERRED EMBODIMENTS

Figure 3:
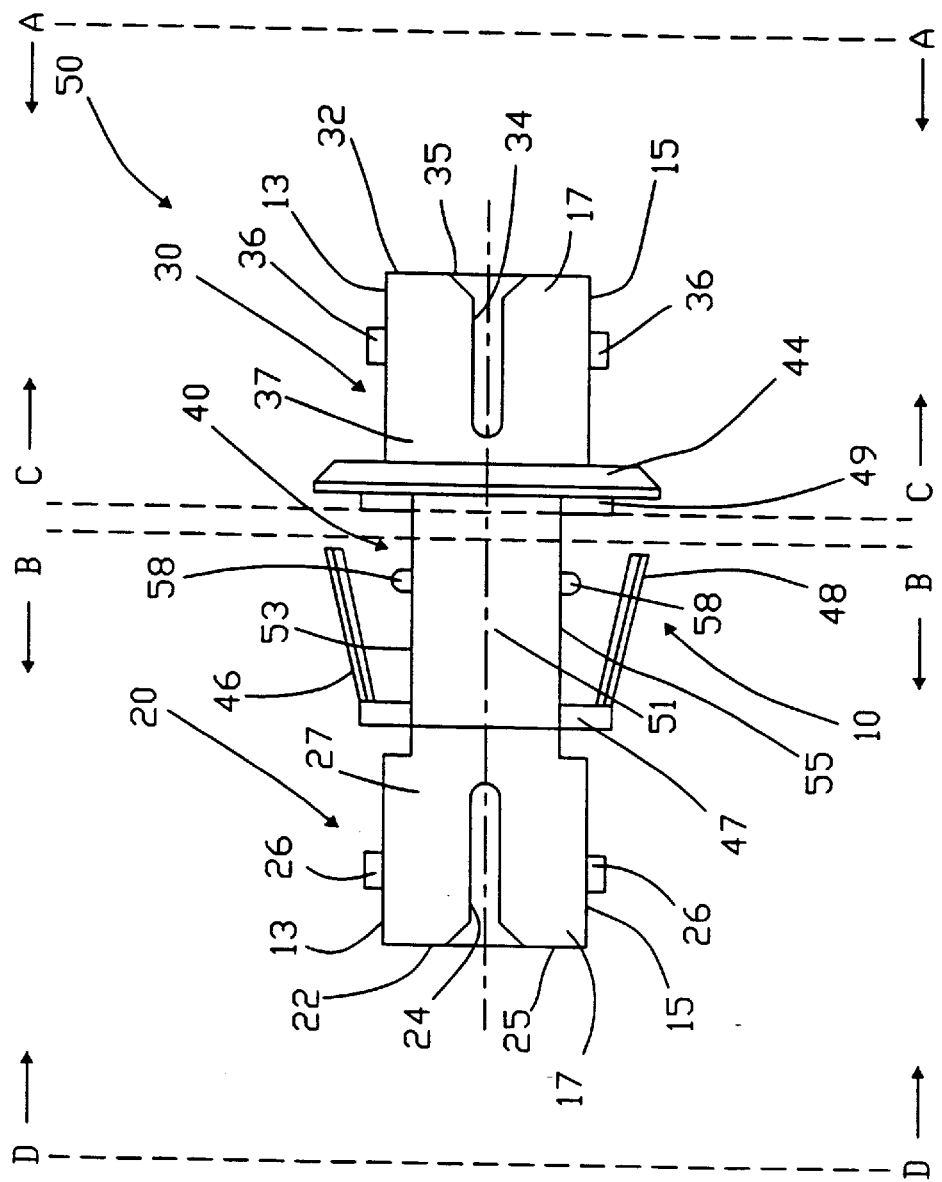
FIG. 3 is a top view of the snap-in plug of this invention.

The present invention pertains to a snap-in coupling for optically interconnecting two fiber optical cables. More specifically, the invention provides for a one-piece snap-in coupling 50 that snaps into a coupling aperture and aligns opposing optical ferrules.

Now turning to FIG. 1, the snap-in coupling 50 of this invention is preferably employed with fiber optical cables 70, 70 having straight-tipped ferrules. As known in the art, straight-tipped connectors are cylindrical or axially aligned housings that surround an end portion of an optical fiber and which provide a mating surface with an opposing optical ferrule. The straight-tipped optical ferrule includes ST, SC, or LC style ferrules well-known in the art. The preferred embodiment is described for ST style optical ferrules, which retain a single optical fiber encased within an elongated cylindrical extension for optical interconnection with other ferrules and devices. The ST style cables 70 typically have a connector end 68, with the ferrule 66 extending outward therefrom. The ferrule 66 may be made from various glass or silicone materials, depending on whether the fiber conducts data in single or multi-mode frequencies. While the preferred embodiment is described for use with an ST style ferrule and connector, it should be readily apparent to one skilled in the art that other straight-tipped ferrules and connectors may be employed in similar fashion.

For ST style and other similar ferrules, the optical cables may be interconnected by aligning the respective ferrules in sufficiently close proximity to allow optical transmission of data. This invention provides for a one-piece 10 body that may contain an alignment sleeve 54 (shown in FIG. 8) for interconnecting opposing ferrules. As will be described below, the ferrules 66 extend from optical cables 70 that are releasably attached to the coupling 50.

Figure 8:
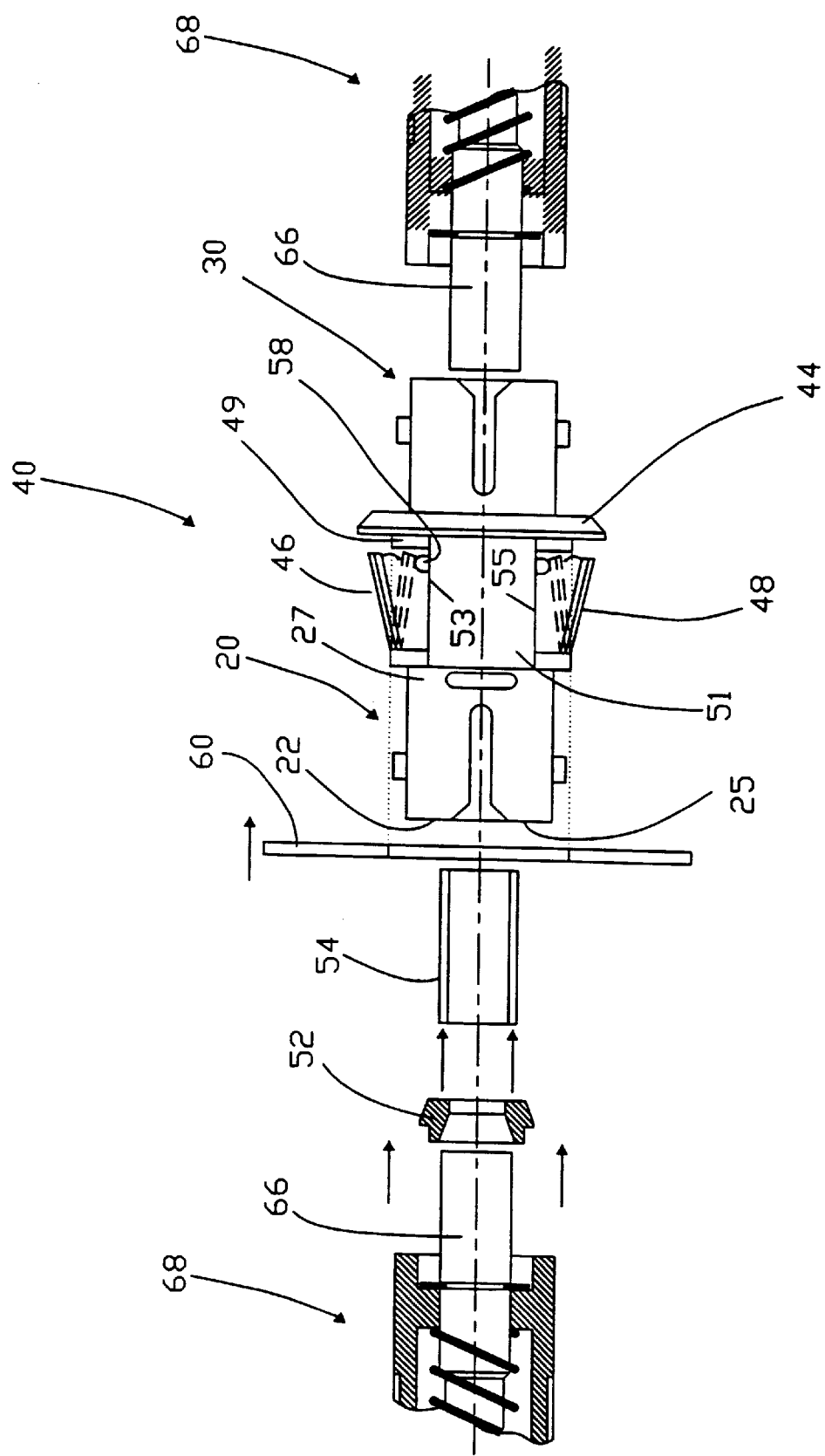
FIG. 8 is an exploded top view of the invention being assembled for employment with a corresponding sleeve, collar, and the connector panel, with the motion of the resilient arms being shown in phantom.

With further reference to FIG. 1, the connector end 68 of the fiber optical cable preferably incorporates a mechanism for attaching the optical cable 70 to the coupling 50. One such device known in the art includes a spring-biased jacket 72 that encases the connector end 68 of the fiber optical cable 70. The jacket 72 releasably attaches to the coupling 50 and allows the ferrule 66 to extend therein to engage the alignment sleeve 54 (FIG. 8). In more detail, the jacket 72 is fastened to a compliant tubing 71 of the fiber optical cable at the connector end 68. A compressive spring encircles 74 the compliant tubing 71 from the connector end 68, and biases the jacket 72 axially along the optical cable 70. The coupling 50 may include retention members 26, 36 that extend from the periphery of the coupling 50 and allow for the jacket 72 to secure thereto. Accordingly, the jacket 72 includes an open surface that defines an engaged and disengaged position for releasably attaching to the retention protrusions 26, 36. In the disengaged position, the jacket 72 is relaxed and loosely engaged with the retention protrusions 26, 36 while resting adjacent to the connector end 68 of the optical cable 70. The jacket 72 may be forced inward and twisted circumferentially, thereby forcing the retention protrusions 26, 36 to slide along the open surface to clasp into a hook region of the open surface. In similar fashion, the retention protrusions 26, 36 may be unclasped from the engaged position of the open region by unbiasing the jacket 72 to the relaxed position.

As FIG. 1 further illustrates, the coupling 50 engages two opposing optical cables and ST style ferrules in the aforementioned manner. The coupling 50 must first releasably attach to a connector panel 60 through a coupling apertures 62 (FIG. 2). Once in position, the coupling 50 may interconnect fiber optical cables received from both sides of the connector panel 60.

With reference to FIG. 2, the snap-in coupling 50 mates with a fiber optical connector panel 60, or similar structure known in the art having coupling apertures 62 for engaging couplings known in the art. Among other applications, the connector panel 60 may commonly be found as part of a fiber optical connector cabinet that stores and interconnects multiple optical cables for a LAN network or other similar communication center. The connector panel 60 typically employ anywhere between 6–24 coupling apertures 62, although more or less may easily be accommodated. As practiced by the art, the coupling apertures 62 may be numbered for reference purposes. This invention specifically provides coupling 50 to releasably engage the panel 60, and provides for opposing fiber optical cables to releasably connect thereto and optically interconnect to one another. While the dimensions and configuration of the invention may vary, the preferred embodiment is dimensionalized and adapted to support ST style fiber optical ferrules and cables previously discussed. Likewise, the connector panel 60 and corresponding coupling apertures 62 for interconnecting ST style ferrules are known in the art.

Figure 4:
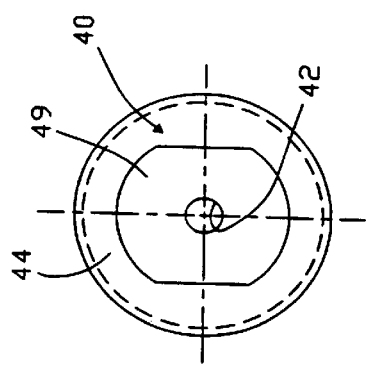
FIG. 4 is an end view of the invention taken at line A—A of FIG. 3.
Figure 7:
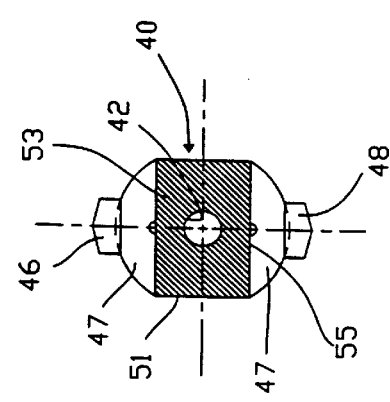
FIG. 7 is an end view of the invention taken at line D—D of FIG. 3.

FIG. 3 shows that the snap-in coupling 50 of the preferred embodiment comprises a one-piece molded plastic body 10 having bored left and right cylindrical segment 20 and 30 with corresponding left and right chamber 22 and 32. The diameters and dimensions of the respective left and right cylindrical segments 20 and 30 are adapted for the ST style fiber optical connectors. The one-piece body 10 is provided with a bored middle segment 40 that merges with the respective left and right segment 20 and 30. The bored middle segment 40 defines a middle chamber 42 (as shown in FIG. 4) that accesses the left and right chambers 22 and 32 to each other. The middle chamber 42 is adapted to receive an alignment sleeve 54 (FIG. 8), and has a smaller diameter than the adjoining left and right chambers 22 and 32. The interface between the middle chamber 42 and adjoining left and right chambers 22 and 32 provide for a respective left and right interior annular shoulder 28 (FIG. 4) and 38 (FIG. 7).

It should be apparent that the left and right orientation only aide the disclosure of the preferred embodiment, and are not a limitation on the overall invention. For discussion purposes, the preferred embodiment is assumed to be radially symmetric, and may be further referenced as a whole by a front and back side 17 and 19 (FIG. 4), and a top and bottom surface 13 and 15. In particular, the left cylindrical segment 20 may include a left opening 25 and a right end 27. The right cylindrical segment 30 is substantially similar to the left cylindrical segment 20 and contains a right opening 35 and a left end 37.

With further reference to FIG. 3, the left cylindrical segment 20 has a left key slot 24 that extends rightward from the left opening 25. Preferably, the left key slot 24 is adapted to receive a key or polarizing element from the connector end 68 and/or jacket 72 (as shown in FIG. 1) engaged therein. In addition, the pair of left retention protrusions 26 assist fastening the optical cable 70 thereto. In similar fashion, the right cylindrical segment 30 also contains a right key slot 34 that extends leftward from the right opening 35. The right key slot 34 is also adapted to receive a key or polarizing element form the connector end 68 and/or jacket 72 engaged therein. Likewise, the pair of right retention protrusions 36 are also provided for fastening the optical cable 70 thereto.

FIG. 3 also shows that the middle segment 40 has a radial extension 44 that abuts the right cylindrical segment 30 and extends outward from the one-piece body 10. In the orientation described with the preferred embodiment, the radial extension 44 serves to preclude the one-piece body 10 from moving leftward upon insertion into the coupling aperture 62 (FIG. 2) from the right. The middle segment 40 further includes a right exterior shoulder 49 that adjoins the radial extension 44 from the left, and a left exterior shoulder 47 that adjoins the left cylindrical segment 20 from the right. A rectangular outer body 51 extends between the left and right exterior shoulder 47 and 49, and contains a top and bottom recess 53 and 55 that extend between the left and right exterior shoulder 47 and 49.

The snap-in coupling 50 releasably attaches with the connector panel 60 by way of a top and bottom resilient arm 46 and 48 that angularly extend outward from the surface of the one-piece body 10. While the top and bottom resilient arms 46 and 48 may be located anywhere on the one-piece body 10, the preferred embodiment provides for both arms to extend from the left exterior shoulder 47 at an angle between 10–20 degrees. Still further, the top and bottom resilient arms 46 and 48 are diametrically opposed to one another on the one-piece body 10. In this way, the top and bottom resilient arms 46 and 48 suspend over the respective top and bottom recesses 53 and 55 of the rectangular outer body 51. In the preferred embodiment, both the resilient arms 46 and 48 bias inward when provided with a corresponding force. As such, the dimensions of the resilient arms 46 and 48 should be such that each arm may be received and completely contained within the top and bottom recess 53 and 55 of the outer rectangular body 51. Thus, the lengths of the top and bottom resilient arms 46 and 48 preferably do not extend over to the right exterior shoulder 49. When relaxed, the resilient arms 46 and 48 increase the effective width of the middle chamber 42, thereby precluding the one-piece body 10 from axially moving from left to right through the coupling aperture 62. The resilient arms 46 and 48 may be biasely forced into the top and bottom recesses 53 and 55 of the rectangular outer body 51, thereby reducing the width of the middle segment 40 to allow axial movement of the integrated body 10 through the coupling aperture 62. In the orientation of the preferred embodiment, biasing the resilient arms 46 and 48 allows the one-piece body to engage the coupling aperture 62 by moving therethrough from right to left. The resulting engagement between the coupling 50 and the coupling aperture 62 provides the "snap" characteristic of the embodiment. The top and bottom recesses 53 and 55 of the outer rectangular body 51 also contains a pair of opposing stand-offs 58 that prevent over-biasing of the resilient arms 46 and 48.

FIG. 4 is a leftward end view from line A—A of FIG. 3 that shows in greater detail the interior configuration of the invention and the alignment of the chambers of the right, middle and left segment 30, 20 (FIG. 3) and 40 (FIG. 3) respectively. In particular, the right chamber 32 is bordered by the interior right annular shoulder 38 and accesses the right cylindrical segment 30 to the middle chamber 42. FIG. 4 also illustrates one preferred alignment of the right retention protrusions 36 on the top and bottom surface 13 and 15. In this embodiment, the right key slot 34 is located along the front side 17 of the one-piece body 10 and opposite from the back side 19. As previously mentioned, the diameter of the right cylindrical segment 30 is dimensioned to receive an ST style optical ferrule. Upon engagement of the ST connector with the right cylindrical segment 30, the ferrule extends beyond the interior right annular shoulder 38 and into the middle chamber 42. As described in greater detail herein, the middle chamber 42 contains the alignment sleeve 54 (FIG. 8) that retains the ferrule 66 (FIG. 1) for optical interconnection with an opposing ferrule inserted through the left cylindrical segment 20.

Figure 5:
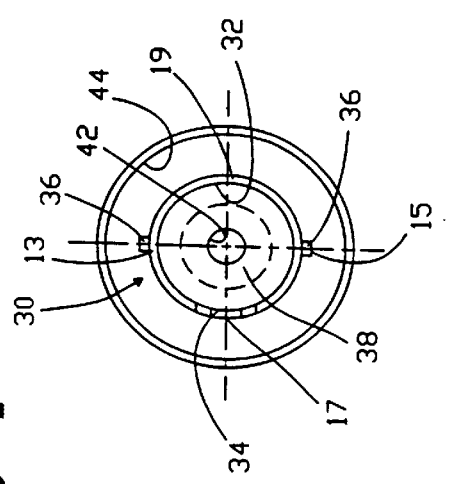
FIG. 5 is a cross-sectional view of the invention taken at line B—B of FIG. 3.

With reference to FIG. 5, a cross-section of the middle segment 40 looking leftward along line B—B of FIG. 3 details the middle segment 40 and chamber 42 without the alignment sleeve 54 (FIG. 8) inserted therein. As shown by FIG. 5, the middle segment 40 contains a left exterior shoulder 47 preferably having semi-elliptical contours that correspond to the preferred coupling aperture 62 (FIG. 2). The resilient arms 46 and 48 align diametrically from one another as they unitarily extend from the left exterior shoulder 47. The rectangular outer body 51 extends rightward from the left exterior shoulder 47 and forms the top and bottom recess 53 and 55. Within the middle segment 40, the middle chamber 42 is smoothly contoured to receive the alignment sleeve 54.

Figure 6:
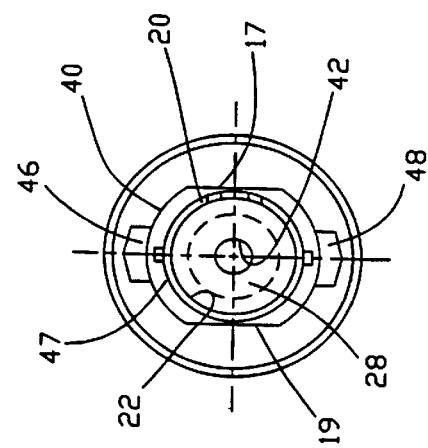
FIG. 6 is a cross-sectional view the invention taken at line C—C of FIG. 3.

FIG. 6 is a cross-sectional view of the middle segment 40 looking rightward along line C—C of FIG. 3. In particular, FIG. 6 shows that the right exterior shoulder 49 abuts the radial extension 44 and borders the middle segment 40 from the right. The middle chamber 42 accesses the right cylindrical segment 30 (FIG. 4), thereby allowing the left and right chamber 22 (FIG. 7) and 32 (FIG. 4) to align with one another and form a continuous optical path from the left opening 25 to the right opening 35 (as shown by FIG. 3).

FIG. 7 is a rightward end view from the left cylindrical segment 20, showing the alignment of the respective segments and chambers within the one-piece body 10. As shown by FIG. 7, the middle segment and left cylindrical segment 40 and 20 align such that the middle and left chamber 42 and 22 form a continuous cylindrical cavity, with the left interior annular shoulder 28 intersecting the left and middle chambers 22 and 42. The middle segment 40 is over-sized relative to the left cylindrical segment 20, as the periphery of the rectangular outer body 51 (FIG. 5) along the front and back side 17 and 19 extends beyond the left cylindrical segment 20. The left exterior shoulder 47 matches the contours of the right exterior shoulder 49 and the coupling aperture 62 (FIG. 2). In this configuration, the resilient arms 46 and 48 extend rightward from the left exterior shoulder 47, so that the one-piece body 10 may be inserted into the coupling aperture 62 from the right via the left cylindrical segment 20.

FIG. 8 provides an exploded view of the one-piece body 10 receiving the alignment sleeve 54 for interconnecting ferrules 66 from opposing optical connectors 68. Preferably, the alignment sleeve 54 is inserted through the left chamber 22, where it passes through the left interior annular shoulder 28 (FIG. 7) to rest within the middle chamber 42. A collar 52 is inserted thereafter to retain the alignment sleeve 54 within the middle chamber 42. As practiced in the art, the collar 52 is slightly skewed as it is inserted into the left chamber 22 to allow the collar to pass through therein. The right end 27 of the left chamber 22 may provide one or more peripheral slots (not shown) that allow the collar 52 to straighten, thereby limiting axial motion of the collar 52 towards the left opening 25. In this way, the collar 52 retains the alignment sleeve 54 in position within the middle chamber 42 (FIG. 4).

FIG. 8 also shows the coupling 50 of this invention engaged with the connector panel 60 via coupling aperture 62 (FIG. 2). As previously mentioned, the coupling aperture 62 and the right exterior shoulder 49 correspond in contour to frictionally engage one another upon insertion of the coupling 50. Preferably, the connector panel 60 rests on the right exterior shoulder 49, where the resilient arms 46 and 48 may combine with the radial extension 44 to maintain the position of the coupling 50 relative to the coupling aperture 62.

With further reference to FIG. 8, the coupling 50 may be engaged in the following manner. The coupling is inserted into the connector panel 60, with the left cylindrical segment 20 initially passing leftward through the coupling aperture 62. The left cylindrical segment 20 slides easily into the coupling aperture 62, while the middle segment 40 that follows frictionally engages the boundaries of the coupling aperture 62. As previously mentioned, top and bottom resilient arms 46 and 48 are located on the periphery of the middle segment 40 over the top and bottom recesses 53 and 55. As shown in phantom by FIG. 8, the resilient arms 46 and 48 biasely depress into the top and bottom recesses 53 and 55 of the rectangular outer body 51 in order to pass through the coupling aperture 62. Once the middle segment 40 is extended through and beyond the coupling aperture 62, the resilient arms 46 and 48 may relax into an unbiased position that closely abut the left side of the connector panel 60. In this position, the length of the resilient arms 46 and 48, combined with the dimensions of the right exterior annular shoulder 49, serve to preclude rightward axial motion of the one-piece body 10. Moreover, the radial extension 44 is preferably located to closely abut the right side of the connector panel 60, thereby precluding leftward axial motion of the integrated body 10. The opposing stand-offs 58 extend from the top and bottom sides 53 and 55 to preclude excessive downward motion of the respective top and bottom arms 46 and 48.

To release the one-piece body 10 from the connector panel 60, the top and bottom resilient arms 46 and 48 are once again depressed, as shown in phantom by FIG. 8, to rest within the top and bottom recesses 53 and 55. The one-piece body 10 may then move rightward through the connector panel 60, with the left cylindrical segment 20 lastly separating from the coupling aperture 62.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, that such changes and modifications be covered by the appended claims.

What is claimed is:

1. A snap-in coupling comprising:
   a one-piece body adapted to engage a coupling aperture;
   said one-piece body having a first segment, the first segment having a first chamber extending longitudinally therein from a first opening, the first chamber being adapted to receive through the first opening an optical connector and ferrule extending therefrom;
   said one-piece body having a second segment adjacent to the first segment, the second segment having a second chamber extending longitudinally therein and aligned with the first chamber;
   said one-piece body having a third segment being substantially identical to the first segment, said third segment having a third chamber extending longitudinally therein towards a second opening and aligning with the second chamber, wherein the third chamber is adapted to receive through the second opening an optical connector and ferrule extending therefrom, and wherein the second opening longitudinally opposes the first opening across the one-piece body;
   said one-piece body including a first resilient arm that angularly extends outward from said one-piece body;
   said one-piece body including a stand-off, wherein the stand-off contacts the first resilient arm when the first resilient arm is biased toward the stand-off so as to prevent over-biasing of the first resilient arm; and
   wherein said second chamber is adapted to receive an alignment sleeve to optically interconnect opposing ferrules inserted therein from the first and second chambers.

2. The snap-in coupling of claim 1 wherein said first and third segments are adapted to receive straight-tipped optical ferrules.

3. The snap-in coupling of claim 2 wherein said second segment is adapted to be received by the coupling aperture of a connector panel.

4. The snap-in coupling of claim 3 further comprising a second resilient arm diametrically opposing said first resilient arm on the one-piece body, wherein said first and second resilient arms may be biased towards the one-piece body to allow the snap-in coupling to pass through the coupling aperture.

5. The snap-in coupling of claim 4 further comprising a first key slot extending towards the second segment along the periphery of the first segment, and a second key slot extending towards the second segment along the periphery of the third segment.

6. The snap-in coupling of claim 5 wherein said second segment includes an outer rectangular body having top and bottom recesses to accommodate said first and second resilient arms when said first and second resilient arms are biased.

7. The snap-in coupling of claim 6 wherein said second segment further comprises:
   a radial extension extending therefrom and abutting said third segment;
   a first exterior shoulder circumscribing the second segment and abutting the first segment; and
   a second exterior shoulder circumscribing the second segment and abutting the radial extension, wherein the rectangular outer body extends between the first and second exterior shoulders.

8. The snap-in coupling of claim 7 wherein said first and second resilient arms extend angularly outward from the second segment towards the third segment.

9. The snap-in coupling of claim 8 wherein said first and second resilient arms extend from the first exterior shoulder at an angle ranging substantially between 10–20 degrees.

10. The snap-in coupling of claim 9 wherein the first opening is adapted to receive an ST style optical ferrule.

11. The snap-in coupling of claim 10 wherein the second opening is adapted to receive an LC style optical connector.

12. The snap-in coupling of claim 10 wherein the second opening is adapted to receive an SC style optical connector.

13. The snap-in coupling of claim 9 wherein the first and second openings are each adapted to receive a ferrule selected from the group consisting of ST, SC and LC style optical connectors.

14. The snap-in coupling of claim 1 wherein said one-piece body is formed from molded plastic.

15. A snap-in coupling comprising:
   a one-piece body formed from molded plastic;
   said one-piece body having a first cylindrical segment, the first cylindrical segment having a first chamber extending longitudinally therein from a first opening, the first chamber being adapted to retain a straight-tipped optical ferrule through the first opening;
   said one-piece body having a second segment merged with the first cylindrical segment, the second segment having a second chamber extending longitudinally therein and aligned with the first chamber, said second segment being adapted to be frictionally received by a coupling aperture;
   said one-piece body having a third cylindrical segment being substantially identical to the first cylindrical segment, said third cylindrical segment having a third chamber extending longitudinally therein towards a second opening and aligning with the first chamber, said second opening longitudinally opposing the first opening across the one-piece body, and the third chamber being adapted to retain a straight-tipped optical ferrule through the second opening;
   said one-piece body including a pair of resilient arms that are positioned diametrically on the second segment and angularly extends outward therefrom, such that said pair of resilient arms bias towards said one-piece body to allow said snap-in coupling to pass trough the coupling aperture;
   said one-piece body including a first stand-off, wherein the first stand-off contacts a first resilient arm of the pair of resilient anns when the first resilient arm is biased toward the first stand-off so as to prevent over-biasing of the first resilient arm;
   said one-piece body including a second stand-off wherein the second stand-off contacts a second resilient arm of the pair of resilient arms when the second resilient arm is biased toward the second stand-off so as to prevent over-biasino of the second resilient arm; and
   said second chamber being adapted to receive an alignment sleeve to optically interconnect opposing straight-tipped ferrules inserted therein from the first and second chambers.

16. The snap-in coupling of claim 15 wherein the first and second chambers are each adapted to receive a ST style optical ferrule.

17. The snap-in coupling of claim 15 wherein the first and second chambers are each adapted to receive a ferrule selected from the group consisting of ST, SC and LC style optical connectors.

18. A snap-in coupling comprising:
   a one-piece body being adapted to be frictionally received by a coupling aperture;
   said one-piece body having a first opening that axially opposes a second opening, wherein said first and second openings are adapted to receive a straight-tipped optical ferrule;
   a first resilient arm extending outward from said one-piece body, said first resilient arm being adapted to be received by said coupling aperture when said first resilient arm is biased; and
   said one-piece body includes a first stand-off, wherein the first stand-off contacts the first resilient arm when the first resilient arm is biased toward the first stand-off so as to prevent over-biasing of the first resilient arm.

19. The snap-in coupling of claim 18 wherein the one-piece body is adapted to be received by the coupling aperture when the first resilient arm is biased towards the one-piece body.

20. The snap-in coupling of claim 19 wherein the first and second openings define a continuous chamber extending therebetween, wherein a portion of said continuous chamber is adapted to receive an alignment sleeve for interconnecting a pair of fiber optical ferrules.

21. The snap-in coupling of claim 20, further comprising a second resilient arm that extends from the one-piece body and diametrically opposes to the first resilient arm.

22. The snap-in coupling of claim 21 wherein said first and second resilient arms abut an outward radial extension extending from a mid-portion of said snap-in coupling, and wherein said mid-portion is adapted to be received by said coupling aperture when the first and second resilient arms are biased.

23. The snap-in coupling of claim 22, further comprising first and second key slots extending towards one another along a periphery of the one-piece body.

24. The snap-in coupling of claim 23 wherein said first and second resilient arms extend from the one-piece body at an angle ranging substantially between 10–20 degrees.

25. The snap-in coupling of claim 18 wherein the first opening is adapted to receive an ST style optical ferrule.

26. The snap-in coupling of claim 25 wherein the second opening is adapted to receive an LC style optical connector.

27. The snap-in coupling of claim 25 wherein the second opening is adapted to receive an SC style optical connector.

28. The snap-in coupling of claim 18, wherein the first and second openings are each adapted to receive a ferrule selected from the group consisting of ST, SC and LC style optical connectors.

* * * * *